United States Patent Office 3,729,434
Patented Apr. 24, 1973

3,729,434
METHOD OF PRODUCING FIRE RETARDANT EMULSIONS
John H. Todd, St. Louis, Mich., assignor to Michigan Chemical Corporation, St. Louis, Mich.
No Drawing. Continuation-in-part of application Ser. No. 769,360, Oct. 21, 1968. This application June 28, 1971, Ser. No. 157,715
Int. Cl. C09d 5/14, 5/16
U.S. Cl. 106—15 FP
4 Claims

ABSTRACT OF THE DISCLOSURE

There is disclosed a method of making a fire retardant aqueous emulsion for treating flammable materials such as cotton and synthetic fabrics. The aqueous emulsion is derived from a stable concentrate comprising a phosphate ester of haloalkanols dissolved in an organic solvent and an emulsifier selected from a number of oil soluble metal sulfonates blended with polyoxyethylene ether, said solvent having a flash point of about 80° F. and a boiling point range of from 300° to 350° F.

CROSS-REFERENCE TO RELATED APPLICATIONS

The present application is a continuation-in-part of my copending patent application Ser. No. 769,360, filed on Oct. 21, 1968, now abandoned.

The present invention relates to flame retardant aqueous emulsions and particularly to the treatment of flammable materials and fabrics with such emulsions to render the same flame retardant.

Conventional methods and procedures for imparting flame retardant properties to many normally flammable materials involve impregnating or otherwise treating the particular material with an aqueous solution containing a flame retarding agent to be followed by a drying operation, usually at elevated temperatures. By and large, treatments of this type are capable of reducing the flammability and/or combustibility of the material treated, but often are effective only if the material is made of hydrophilic and similar fibers. Exemplary of hydrophilic materials are cotton, viscose rayon, ramie, jute, paper, fiber board, burlap and the like. These materials are characterized by having affinity for water thus enabling the dissolved flame retardant to be deposited effectively on the material. Some success has also been shown when aqueous compositions containing suitable flame retarding agents are applied to materials made from fibers which can take up water due to their physical structure. For example, spun-bonded polyester fibers are capable of adsorbing water because of surface interstices. Similarly, other synthetic fibers may have comparable structural arrangement to induce the take-up of water, such as by capillary attraction, and consequently obtain some flame retardancy. Of course, blends of various fabrics may be treated in aqueous media as long as one, or more, fabric is either a hydrophile or capable of taking-up water.

The difficulties encountered heretofore have dealt with the choice of the particular flame retarding agent. The reason for this is that most good flame retardants are not miscible or compatible with water. Many of the well-known flame retarding agents are organic compounds containing phosphorus or nitrogen and often do not lend themselves to form aqueous solutions. But in order to take advantage of the excellent flame retardancy provided by these compounds it was necessary to solubilize them in suitable organic solvents and apply the resulting compositions to the fabric to be treated. Not only has this procedure been expensive but, in many cases, the solvent affected the fabric adversely, especially in the presence of certain dyes or other additives in the fabric. Furthermore, solvent recovery and application with its attendant capital expenditures and the limited number of suitable organic solvents have made non-aqueous systems very undesirable. Conversely, use of aqueous compositions provides fewer and less serious problems from a technological point in addition to economic advantages. In effect, flame retardant aqueous compositions can be applied to the desired fabric by relatively simple operation such as padding, dipping, spraying or rolling.

Phosphoric acid esters of haloalkanols have been known to be especially effective as flame retardants for various resin compositions such as polystyrene, polyesters, polyurethane foams, epoxy resins and the like. These phosphate esters have been added directly to the fabric or to the components comprising the resin composition. Organic solvents are used occasionally to aid in applying these phosphate esters to the particular fabric or material. But as stated above, aqueous systems are preferred.

The present invention is directed to treating flammable fabrics and materials with aqueous emulsions containing a particular type of flame retardants. These can be represented by the following formulas:

(I)  $(XCH_2CHXCH_2O)_3PO$ (II) $[XCH_2CH(CH_2X)O]_3PO$ wherein X can be bromine or chlorine. Tris (2,3-dibromopropyl) phosphate and tris (1-bromo-3-chloroisopropyl) phosphate have been especially effective as flame retardants, and both have been used for treating paper and cellulosic fibrous materials such as cotton. However, a non-aqueous system has been considered necessary for applying these esters. For instance, cotton cloth has been flame retarded by immersing it in a system consisting of tris (2,3-dibromopropyl) phosphate, ethanolamine, oleic acid and triethylolmelamine—see Quartermaster Research and Engineering Center, Textile, Clothing and Footwear Division, Textile Service Report No. 100, July 1957.

The flame retarding agents represented by the above formulas of the phosphate esters are especially difficult to formulate in aqueous compositions. These esters are not water soluble and have resisted efforts to form aqueous emulsions which are stable enough to be useful even when a wide variety of emulsifying agents have been tried. According to the present invention an emulsion-forming concentrate can be produced by dissolving the flame retardant ester in an organic solvent to which is added an emulsifier making a concentrate suitable for use in forming an oil in water emulsion. It should be pointed out that both the organic solvent and the emulsifier should possess particular properties to enable the production of a stable concentrate. This, of course, will provide versatile means for wider coverage of fibers and fabrics. Moreover, the emulsions made from the concentrate are easy to produce and will not require any additional equipment for application purposes.

Solvents: In order to formulate the concentrates of the present invention a solvent having the necessary properties is required. Among other things, such solvents should (a) possess the ability to dissolve the flame retarding agents represented by the above structural Formulas I and II;
(b) be immiscible with water or substantially so;
(c) have a specific gravity as low as possible, i.e., equal to or lower than water, if possible;
(d) have a flash point high enough to avoid shipping restrictions and other regulations, and to avoid difficulties from the safety point of view;
(e) have a boiling point low enough to permit removal of the solvent with water, but not so high as to cause it to remain in the material treated.

Preferably, the solvent should have an API gravity of about 30, a flash point about 80° F. (Tag Closed Cup Method, ASTM) and a boiling point of 300° to 350° F. API gravity is related to the determination of specific gravity by an empirical equation. A procedure for measuring it by means of a glass hydrometer has been evolved for crude petroleum and liquid petroleum products, see ASTM Standards, Part 17, page 120 et seq., of the 1964 edition published by the American Society for Testing and Materials, Philadelphia, Pa. To enable, further, the selection of the correct organic solvent, in so far as its dissolving power is concerned, the kauri butanol number should be at least 85. The kauri butanol number (KB) provides a measure of the dissolving power of the solvent, said power being determined by adding the solvent, under a standard set of conditions, to a solution of kauri resin in butanol to produce a defined degree of turbidity—see ASTM Standards, Part 8, page 402 et seq. of the 1958 edition.

Various organic solvents or mixtures thereof can be formulated in the laboratory to provide a solvent or blend of solvents which is satisfactory for the practice of the present invention. For example, a mixture of 6 parts by weight of hexane to 8 parts by weight of toluene is satisfactory, although it has a rather low flash point. For commercial purposes, it is believed that a variety of petroleum solvents including mixtures thereof could be obtained which will have the requisite and desired properties. A solvent satisfying the requirements stipulated above is known as "LA30" which is a petroleum solvent having an API gravity of 29.7, a flash point of 112° F., a KB value of 92 and a boiling range of 316° to 330° F. "LA30" is a product sold by Leonard Refineries, Inc., Alma, Mich.

Emulsifiers: According to McCutcheon's "Detergents and Emulsifiers" (1968 edition), there are over 3,000 surface active agents available in the market place with over 300 producers. Thus some means for screening and/or testing should be provided to determine the type of surfactants or emulsifying agents suitable for the present invention. Emulsification may be defined as the ability to bring two immiscible liquids into intimate contact with one another, through the reduction of their interfacial tensions. Emulsions can be of varying stability and usually are susceptible to changes in pH, temperature, or other factors. To form stable concentrates which, in turn, yield stable and satisfactory aqueous emulsions of the flame retarding agents mentioned hereinabove, it has been found necessary that the emulsifier (1) comprises blend of oil soluble metal sulfonates and polyoxyethylene ethers, and (2) has a hydrophile lipophile balance (HLB) of 10–14.

Any oil soluble metal sulfonate capable of blending with a polyoxyethylene ether is acceptable. The preferred type, however, is the calcium salt because the calcium ions appear to enhance the solubility of the sulfonate in hydrocarbons and further have some beneficial effects on the ether portion of the blend. In this connection it should be pointed out that the blend comprises a nonionic portion, i.e., polyoxyethylene ether and an anionic portion, i.e., metal sulfonate. The ratio of these two portions may vary from one application to another but the (HLB) value must fall within the range 10–14.

The hydrophile lipophile balance (HLB) provides one means of measuring the size and strength of the hydrophilic and lipophilic groups of the emulsifier. All emulsifiers possess both hydrophilic and lipophilic groups, although blends of emulsifiers can be used so that individual numbers of the blend may differ from each other. Generally speaking, an emulsifier which is lipophilic is characterized by a low HLB number (below 10) and one that is hydrophilic by a high HLB number (above 10). The scale runs from 0 to 20. However those emulsifiers within the range of 9–11 might be considered intermediate in nature. Thus when an oil in water type emulsion is desired for the final product, as in the case for the present invention, water soluble groups should predominate and the emulsifier should have a relatively high (HLB) number. This can be effected by adjusting the components of the blend to yield the desired value. Such adjustments can be carried out when it is appreciated that the anionic portion of the blend comprises a potentially strong hydrophilic moiety in the negatively charged sulfonate group. Thus the more soluble the metal sulfonate the more hydrophilic. But because of other important factors dealing with the emulsification of the flame retardant sulfonates of moderate solubility are much preferred, i.e., the alkaline earth salts, particularly calcium.

Influenced by similar factors the nonionic portion of the blend is made moderately hydrophilic. Even though the polyoxyethylene ethers bear no charge when dissolved or dispersed in aqueous media, they still have hydrophilic tendency. Any oxygen present in the nonionic portion, which is capable of hydration will enhance its hydrophilic property. Thus in the case of the polyoxyethylene ethers, the more ether linkages the greater the hydrophilic tendency and consequently the higher the (HLB) value.

At this jucture, it should be emphasized that the (HLB) value is significant only in relation to the blend described above. A great number of emulsifiers are not satisfactory even though they possess (HLB) numbers falling within the recommended range.

The HLB number of most emulsifying agents is published information although it can be measured by laboratory procedures if necessary or desirable. Such methods together with more detailed information concerning the HLB systems, are set forth in "The Atlas HLB System," 4th Printing, Atlas Chemical Industries, Inc., Wilmington, Del.

Based on the above teachings, it can be seen that a chemist or ordinary skill in the art will become aware of the particular properties expected of the emulsifier and consequently know the components without much difficulty. For example, the oil soluble metal sulfonate can be a salt of an alkylbenzenesulfonate, e.g. calcium salts of dodecylbenzenesulfonic or tridecylbenzenesulfonic acids. As the nonionic portion of the emulsifier blend a polyoxyethylene ether containing from 2 to 6 moles of oxyethylene may be used. For further assistance in formulation, chemical designation or description reference is made to a comprehensive article by W. C. Griffin, Encyclopedia of Chemical Technology, edited by Kirt-Othmer, Second edition, volume 8, pp 117–154. Also, see volume 19 of the same reference pp. 507–593 wherein a detailed listing and theoretical discussion of the various surfactants are provided.

Generally, emulsifiers having the requisite properties are avialable commercially. For the purposes of practicing the present invention it has been found preferable to utilize any of the following commercial emulsifying agents: "Emcol" N–139B, "Emcol" H–141B, "Emcol" N–141B, "Emcol" 500B, or 'Emcol" AD6–39A. These emulsifiers are blends of oil soluble calcium sulfonate and polyoxyethylene ethers. They have (HLB) values of 10.0, 12.5, 12.1, 13.0 and 13.5, respectively. Depending on the particular emulifier used to form the concentrate it may be necessary to utilize deionized water to get the optimum emulsion as in the case of "Emcol" H–141B. Occasionally hard water is used in which case the emulsifier having the high (HLB) value should be used, but depending on the degree of hardness a blend of two or more emulsifiers may appear best. These "Emcol" emulsifiers are products of the Witco Chemical Co., Inc., Organic Division, Chicago, Ill.

FORMULATION OF THE CONCENTRATE AND OF THE EMULSIONS

The emulsion-forming concentrate of the present invention can be formulated in any suitable manner whenever the correct components are utilized. Thus the solvent must solubilize both the flame retardant and the emulsifier. Of course, the extent of solubility may differ from one flame retardant to another and from one emulsifier to another. The following ranges, however, were found to provide concentrates yielding good flame retardant emulsions: Solvent 20–65% by weight, fire retardant additive 10–65% by weight and emulsifier 5–25% by weight, all percentages referring to the weight of the concentrate. As a general rule, the amount of the solvent should not be at the maximum level whereas the emulsifier and flame retardant should be added to maximize the amount of flame retardant. A preferred concentrate has about 40% solvent, 50% flame retarding agent and 10% emulsifying agent, all percentage being by weight of the concentrate, Thus a typically preferred concentrate will have about 50% of a flame retarding agent selected from the haloalkyl phosphate esters given by the Formula I and II, representative of which is tris (2,3-dibromopropyl) phosphate.

The above described concentrates have been found to be quite stable, particularly to temperatures and shipping conditions, which provide an economic advantage. When mixed with water under agitation these concentrates yield oil in water emulsions ready for application. Agitation with high shear may be necessary but the components will not break or degrade by such treatment. The extent of water needed to yield the emulsion depends on the amount of flame retarding agent necessary to treat the particular fabric or material. Accordingly, the amount of the concentrate may comprise 10 to 50% by weight of the emulsion. If the concentrate contains a flame retarding agent to the extent of 50% by weight, then the emulsion will contain it from 5 to 25% by weight. The nature of the fabric to be treated will often dictate how much flame retardant is necessary and the most suitable emulsion composition. Emulsions containing a high percentage of solvent may not be desirable in some application because of interference to application operations.

The emulsions of the present invention, once formed, are stable for a period of several weeks, and sometimes indefinitely. They are stable at ambient temperatures and even at relatively elevated temperatures, i.e. 70° C. They are preferably formed by adding the concentrate to deionized water. It appears that deionized or distilled water contributed to the length of the stability. However, water containing up to 5% by weight dissolved salts may be used. The presence of the salt will often increase the solubility of the calcium sulfonate which in turn may affect the prolonged stability of the emulsion.

To obtain an aqueous emulsion containing an effective flame retarding agent is not necessarily new. To obtain one which is stable for an extended period of time is, however, quite significant. In the past, attempts to emulsify halogenated phosphate esters resulted in unsatisfactory formulations, particularly for aqueous applications.

The following examples are given by way of illustration and are not to be construed as limiting the invention. All parts, percentages and proportions referred to herein and in these examples should be regarded as parts by weight unless indicated otherwise.

EXAMPLE I 200 gms. of tris (2,3-dibromopropyl) phosphate were dissolved in 150 gms. of "LA–30." This solution formed quite easily. 40 gms. of "Emcol" "H141" was then added to the solution and dissolved therein. 250 ml. of this concentrate weighed 324 gms.; that is, its specific gravity was 1.296. A flash point determined by the Tag Open Cup Method was run and the flash point was found to be 125° F.

400 ml. of deionized water was placed in a Waring Blendor and 78 gms. of the concentrate referred to above was stirred into it while the blender was operated at high speed. This stirring operation took a total of about 2 minutes to form the aqueous emulsion.

A 3" x 12" piece of spun bonded polyester fabric was dipped in this aqueous emulsion and squeezed to remove the excess liquid and dried for 30 minutes at 130° C. The dry add-on was 0.28 gm. The dry add-on is the increase in weight of the specimen after treatment and drying, over its weight before treatment. This piece was cut into three 1" x 12" strips and tested by the match test. All three strips were self-extinguishing.

The match test involves suspending a 1" x 12" specimen vertically lengthwise from a clamp. A mark is made in the middle of the 12" length. A wooden match is then lit and used to ignite the bottom of the 1" edge of the specimen. The specimen is in contact with the flame of the match until the latter is consumed (about 15 seconds). If the flame is extinguished within 5 seconds after the match is consumed, and the specimen does not burn beyond the center mark, the fabric is considered to be self-extinguishing.

EXAMPLE II

Following the procedure described in Example I a concentrate having the same composition is made. It will be observed that this concentrate contains slightly over 50% weight of the flame retarding agent tris (2,3-dibromopropyl) phosphate. An aqueous emulsion containing 25% by weight of the flame retarding agent is made by mixing 100 grams of the concentrate with 100 mls. of deionized water under agitation with high shear. A 12" x 14" piece of fabric (65% polyester–35% cotton) was immersed in a 50 gms. portion of said emulsion and wrung out to remove excess liquid. A 24.8% dry add-on was obtained. Two strips measuring 3" x 14" were tested according to the AATCC test which involves mounting the specimen in a holder enclosed in a cabinet wherein a standardized flame is applied to said specimen under controlled and specified conditions. The time of the flaming and afterglow is observed and the length of the char is measured. See Technical Manual of the American Association of Textile Chemists and Colorists, volume 36, pp. 135–35 (1960), published for the association by Howes Publishing Company, Inc., New York, N.Y. The results of the test conducted on the two strips showed a char length of 3½" and 4¾", respectively. These results are considered satisfactory in that the treated fabric blend of polyester-cotton is regarded as flame retarded.

EXAMPLE III

A 20 grams portion of tris (2,3-dibromopropyl) phosphate, 16 grams of organic solvent ("LA–30" product of Leonard Refineries, Alma, Mich. as described above), 2 grams of an emulsifier blend "Emcol" 141B and 2 grams of another emulsifier having a higher (HLB) value, i.e., "Emcol" H500B were mixed and stirred together until a solution was formed. This solution, or concentrate, is 50% flame retarding agent, 40% organic solvent and 10% emulsifier; all percentages being by weight of the concentrate.

An aqueous emulsion containing ammonium chloride was made by adding the entire concentrate solution formed above to 140 grams of 1.5% by weight aqueous ammonium chloride solution, and agitating the mixture with high speed to provide shear. The readily formed aqueous emulsion was ready for application. Its stability was checked after two full weeks without any notice of settling, separation or deterioration.

A different blend of emulsifiers can be used, if desired. For example, instead of "Emcol" H500B, the same amount, i.e., 2 grams, of "Emcol" AD6–39A may be used. These two emulsifiers are relatively more hydrophilic than the ones used in Examples I and II as they have (HLB) values of 13.5. Hydrophilic emulsifiers are desirable when the water used to form the emulsion contains dissolved salts.

Other phosphate esters belonging to Formulas I and II have been tried with comparable success as the tris (2,3-dibromopropyl) phosphate. Of note are the chloro and the chlorobromo derivatives. Of course, the bromine-containing phosphate esters are believed to be better flame retarding agents than the corresponding chlorine-containing esters and therefore are recommended. Depending on the desired degree of flame retardancy expected of the treated fabric or material, one may prefer the use of a particular ester over the other, or even a blend of two or more esters. It has been shown that tris (2,3-dibromopropyl) phosphate, tris (1-bromo-3-chloroisopropyl) phosphate and tris (2,3-dichloropropyl) phosphate provide adequate flame retardancy when incorporated in the emulsions of the present invention.

What is claimed is:

1. A method of making a stable flame retardant aqueous emulsion for treating flammable material which comprises preparing a concentrate by dissolving a flame retarding agent selected from those represented by the formulas:

wherein X is chlorine or bromine in a substantially water immiscible organic solvent characterized by having a flash point of at least 80° F. and a boiling point within the range of about 300° to about 350° F., said concentrate also containing an emulsifying agent consisting essentially of an oil soluble, metal sulfonate and a polyoxyethylene ether blended in proportions such that the emulsifying agent possesses a value of about 10–14 with respect to its hydrophile lipophile balance; said flame retardant agent representing from 20–65%, said emulsifying agent 5–25%, and said solvent 20–65% by weight of said concentrate; and mixing the prepared concentrate with sufficient water under agitation for forming a stable aqueous emulsion.

2. A method according to claim 1 wherein mixing said concentrate with water is done under agitation with high shear.

3. A method of making a stable aqueous emulsion according to claim 1 wherein the flame retarding agent consists of tris(2,3-dibromopropyl) phosphate, or tris(1-bromo-3-chloroisopropyl) phosphate, or tris(2,3-dichloropropyl) phosphate or mixtures thereof.

4. A method according to claim 1 wherein the emulsifying agent is a blend of an oil soluble calcium sulfonate and a polyoxyethylene ether.

References Cited

UNITED STATES PATENTS

| | | | |
|---|---|---|---|
| 2,574,515 | 11/1951 | Walter et al. | 106—177 X |
| 3,121,106 | 2/1964 | Nagy | 106—15 X |
| 3,279,929 | 10/1966 | Peters | 106—18 |

OTHER REFERENCES

J. W. McCutchen: "Detergents and Emulsifiers," 1963, p. 55.

Quartermaster Res. & Eng. Center, Textile, Clothing and Footwear Div., Technical Service Report No. 100, July 1957.

JOAN B. EVANS, Primary Examiner

U.S. Cl. X.R.

106—285; 117—137; 252—8.1, 311.5